United States Patent
Akaike et al.

(10) Patent No.: US 11,017,578 B2
(45) Date of Patent: May 25, 2021

(54) DISPLAY CONTROL SYSTEM TO CONTROL A DISPLAY BASED ON DETECTING WIND

(71) Applicants: Mana Akaike, Tokyo (JP); Nobuyuki Kishi, Tokyo (JP)

(72) Inventors: Mana Akaike, Tokyo (JP); Nobuyuki Kishi, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/583,968

(22) Filed: Sep. 26, 2019

(65) Prior Publication Data
US 2020/0105042 A1  Apr. 2, 2020

(30) Foreign Application Priority Data

Sep. 28, 2018 (JP) .............................. JP2018-185958
May 13, 2019 (JP) .............................. JP2019-090843

(51) Int. Cl.
| | |
|---|---|
| *G06T 13/60* | (2011.01) |
| *G01W 1/04* | (2006.01) |
| *G06F 3/14* | (2006.01) |
| *G06T 13/80* | (2011.01) |

(52) U.S. Cl.
CPC .............. *G06T 13/60* (2013.01); *G01W 1/04* (2013.01); *G06F 3/14* (2013.01); *G06T 13/80* (2013.01)

(58) Field of Classification Search
None
See application file for complete search history.

(56) References Cited

U.S. PATENT DOCUMENTS

| | | | |
|---|---|---|---|
| 10,634,977 B2 * | 4/2020 | Ikeno | G01D 7/06 |
| 2013/0201194 A1 * | 8/2013 | Ko | G06F 3/0487 345/473 |
| 2014/0333612 A1 | 11/2014 | Itoh et al. | |
| 2016/0031700 A1 * | 2/2016 | Sparks | H04R 1/028 381/91 |
| 2016/0307028 A1 * | 10/2016 | Fedorov | G06T 11/60 |
| 2017/0011529 A1 * | 1/2017 | Urashita | G06K 9/00771 |
| 2017/0039909 A1 | 2/2017 | Itoh et al. | |
| 2017/0372649 A1 | 12/2017 | Itoh et al. | |
| 2018/0047209 A1 * | 2/2018 | Funami | G06T 19/00 |
| 2018/0124466 A1 * | 5/2018 | Park | G06F 3/04883 |
| 2018/0204372 A1 * | 7/2018 | Sudheendra | G06F 1/1694 |
| 2019/0234773 A1 * | 8/2019 | Ikeno | G03B 21/134 |

FOREIGN PATENT DOCUMENTS

| | | | |
|---|---|---|---|
| JP | 5991406 | 8/2016 | |
| JP | 2016-192819 | 11/2016 | |
| JP | 2017-037614 | 2/2017 | |
| JP | 2018-019426 | 2/2018 | |
| JP | 6361146 | 7/2018 | |
| WO | WO-2016152070 A1 * | 9/2016 | H04N 1/32149 |

* cited by examiner

*Primary Examiner* — Jeffrey J Chow
(74) *Attorney, Agent, or Firm* — Oblon, McClelland, Maier & Neustadt, L.L.P.

(57) ABSTRACT

A display control system includes a display, a detector, and a controller. The display is configured to display an image. The detector is configured to detect wind. The controller is configured to, in response to the detector detecting wind, control the image based on strength of the detected wind.

19 Claims, 19 Drawing Sheets

| ATTRIBUTE INFORMATION | INFORMATION INDICATING MOVEMENT PATTERN |
|---|---|
| FLOWER A | PATTERN 1 |
| SOAP BUBBLES | PATTERN 2 |
| BUTTERFLY | PATTERN 3 |
| ... | ... |

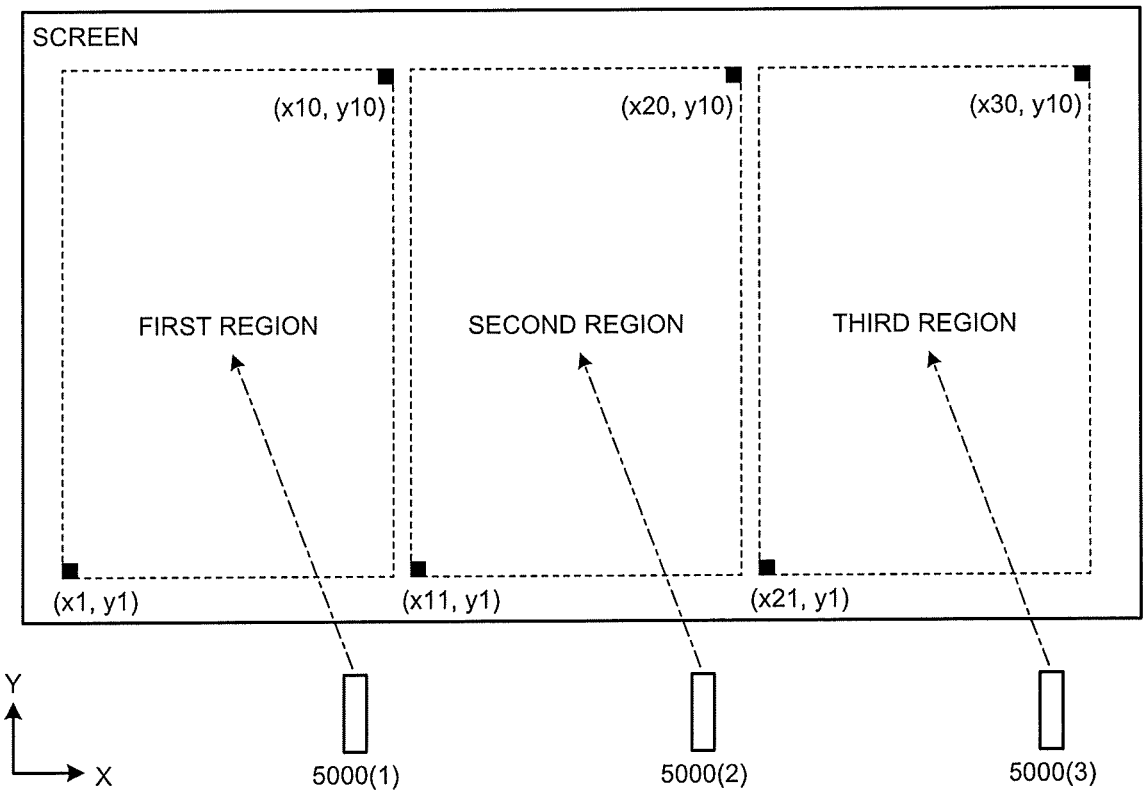

DISPLAY CONTROL SYSTEM TO CONTROL A DISPLAY BASED ON DETECTING WIND

CROSS-REFERENCE TO RELATED APPLICATIONS

The present application claims priority under 35 U.S.C. § 119 to Japanese Patent Application No. 2018-185958, filed on Sep. 28, 2018 and Japanese Patent Application No. 2019-090843, filed on May 13, 2019. The contents of which are incorporated herein by reference in their entirety.

BACKGROUND OF THE INVENTION

1. Field of the Invention

The present invention relates to a display control system, a display control device, and a display control method.

2. Description of the Related Art

In recent years, it has been widely performed to import an image of coloring or a handwritten image to a computer, set regular or random movements with respect to the imported image, and display the image as a dynamic picture image by a display, a signage, or the like, due to performance improvement of a computer device (see Japanese Patent No. 6361146).

However, the movement of an image displayed on a screen has been conventionally determined by identification information provided beforehand on a sheet and the amount of characteristic in an image of coloring or a handwritten image drawn by a user. Therefore, it has not been possible to cause the image displayed on the screen to perform a movement reflecting a user's instruction.

SUMMARY OF THE INVENTION

According to an aspect of the present invention, a display control system includes a display, a detector, and a controller. The display is configured to display an image. The detector is configured to detect wind. The controller is configured to, in response to the detector detecting wind, control the image based on strength of the detected wind.

BRIEF DESCRIPTION OF THE DRAWINGS

FIG. 23 is an explanatory diagram of how to divide regions to be associated with each of three communication devices with respect to a display image region;

FIGS. 24A and 24B are diagrams illustrating setting examples of a table when the projection medium is divided in the manner illustrated in FIG. 23;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
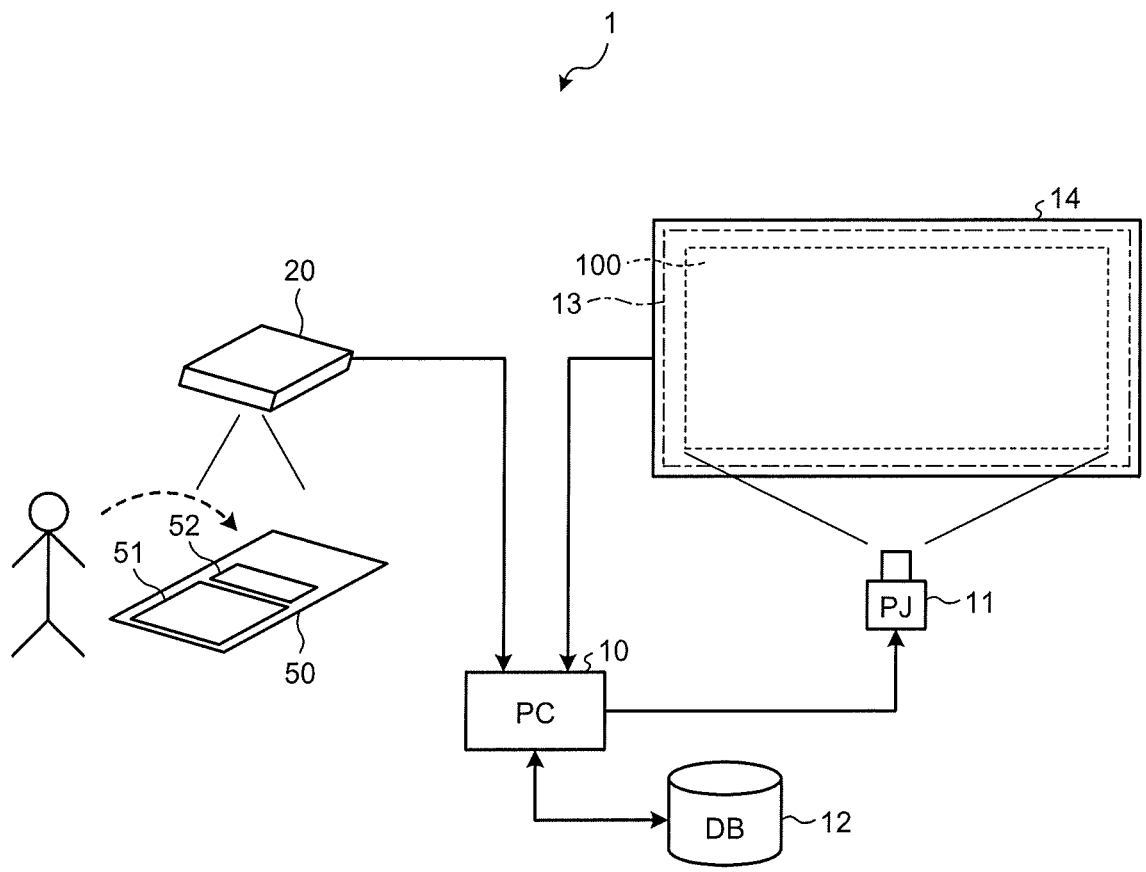
FIG. 1 is a diagram illustrating an example of a configuration of a display control system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a display control system, a display control device, and a display control method that can cause an image displayed on a screen to perform a movement reflecting a user's instruction.

Embodiments of a display control system, a display control device, a display control method, and a computer-readable medium are described below in detail with reference to the accompanying drawings.

Embodiment

As an example, an application example of the present invention to a display control system that displays a handwritten image of a picture (including coloring) drawn on a specified sheet in an event site by a guest who has visited an event such as an exhibition is described. The picture drawn on the specified sheet is not limited to the one drawn by a guest but also includes one drawn by a staff member. Further, the picture is not limited to a drawn picture but also includes a pre-printed picture. These images correspond to "individual image", and, hereinafter these images are collectively referred to as "user image". The "sheet" is an example of a medium. Further, guests and staff members are collectively described as "user", which means mainly a guest, and a staff member is used for a case where a clear specification is required.

FIG. 1 is a diagram illustrating an example of a configuration of a display control system according to a first embodiment. In FIG. 1, a display control system 1 includes a computer (PC) 10, a projector (PJ) 11, a database (DB) 12, a sensor 13, and an image acquisition device 20. The entire operation of the display control system 1 is controlled by the PC 10 that executes a control program (including a display control program). In this configuration, the PC 10 and the DB 12 correspond to "controller". The PJ 11 corresponds to "display". The sensor 13 corresponds to "detector". The image acquisition device 20 corresponds to "image acquisition circuitry". Further, a projection medium 14 corresponds to "display target".

The PC 10 also corresponds to "display control device". Further, the PC 10 can be a single body or can be configured by a plurality of computers.

A sheet 50 includes a handwriting region 51 for a user to handwrite a picture, and an attribute setting region 52 in which an attribute of a picture drawn in the handwriting region is set.

The image acquisition device 20 has a camera or a scanner that takes an image of the sheet 50 set by a user by an image pickup device such as a CCD (Charge Coupled Device) or a CMOS (Complementary Metal Oxide Semiconductor). The image acquisition device 20 acquires an entire image of the sheet 50 by taking the image by the image pickup device.

The DB 12 is a database in a storage of the PC 10 or in an external storage. The DB 12 manages an image acquired by the image acquisition device 20 and setting for controlling the movement of the image in various types of information tables.

The PJ 11 projects display information to the projection medium 14 according to an output from the PC 10. For example, a projection screen is used for the projection medium 14. As the projection screen, a mat screen, a pearl screen, a silver screen, or a bead screen can be appropriately selected according to a usage environment. Further, it can be configured such that a transparent screen is used to project display information to the PJ 11 from the rear side of the screen. In any case, a projection medium having a material on which projected display information can be displayed is used.

The sensor 13 is a wind sensor. According to the present embodiment, the sensor 13 is installed so as to detect wind when a user breathes on an image 100 displayed on the projection medium 14 via a display surface. In the present embodiment, a motion of a user who breathes on the image 100 and the display surface is described as a user's instruction as an example.

Figure 2:
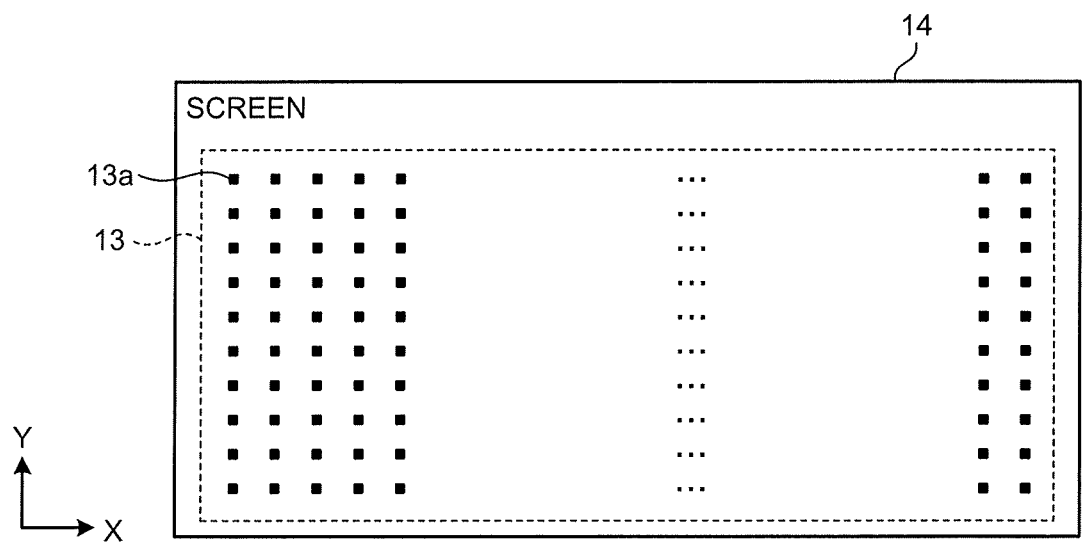
FIG. 2 is a diagram illustrating an example of arrangement of a wind sensor installed in a projection medium.

FIG. 2 is a diagram illustrating an example of arrangement of a wind sensor 13a installed in the projection medium 14. In FIG. 2, each of dots illustrated inside of a dotted line represents the wind sensor 13a. In the example, 30 wind sensors 13a are used in an X direction of the projection medium 14 and 10 wind sensors 13a are used in a Y direction thereof, and the wind sensors 13a are arranged with a predetermined interval therebetween. Illustrations by dots of several wind sensors 13a in the X direction are omitted.

The number and arrangement layout of the wind sensors 13a are not limited to those illustrated in FIG. 2, and can be set appropriately depending on the size of the projection medium 14 and resolution of the image 100. As another layout different from the lattice arrangement in FIG. 2, for example, a layout in which a plurality of concentric circles are installed with a predetermined interval therebetween in a radial direction can be considered. Further, the number of wind sensors 13a may be only one, or may be two installed at opposite ends, or the wind sensors 13a may be dispersed and installed at three or four positions.

The respective wind sensors 13a illustrated in FIG. 2 are arranged so that, when a user breathes on the image 100 displayed on the projection medium 14 via the display surface, the wind caused thereby can be detected. For example, the wind sensor 13a can be arranged on the surface of the projection medium 14, or a ventilation hole or a ventilation groove may be arranged on the surface of the projection medium 14 and the wind sensor 13a can be installed inside (the rear side) of the projection medium 14 or in the arranged groove.

When the wind sensor 13a is installed in the projection medium 14 in this manner, when the user directly breathes on the image 100 projected on the projection medium 14, generation of wind and the wind strength can be detected.

So long as a signal can be output by detecting wind, a sensor that detects the wind according to any principle can be adopted as appropriate. For example, there is a sensor that uses such a principle that, when wind is blown to a resistance line (a hot wire) heated by a constant current, the temperature of the hot wire decreases. In this case, the wind can be detected by detecting a change in a resistance value due to a temperature drop of the hot wire. Such a wind sensor may be installed as a wind sensor module. A result acquired by detection by the wind sensor 13a is transmitted to the PC 10.

Figure 3:
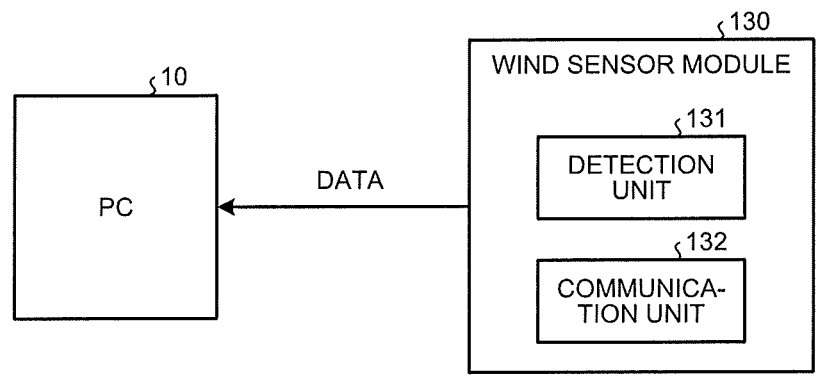
FIG. 3 is a diagram illustrating an example of a configuration of a wind sensor module as an example of the wind sensor.

FIG. 3 is a diagram illustrating an example of a configuration of a wind sensor module 130 as an example of the wind sensor 13a. The wind sensor module 130 includes a detection unit 131 and a communication unit 132 that communicates with the PC 10. The detection unit 131 is a circuit that monitors the resistance value that varies depending on the temperature of a hot wire, outputs a signal indicating detection when there is a change in the resistance value that exceeds a predetermined threshold, and outputs the resistance value itself at all times. The communication unit 132 is a communication circuit that transmits unique identification information (sensor identification information) memorized in each wind sensor module 130 and information detected by the detection unit 131 to the PC 10. Communication with the PC 10 can be performed in a wired or wireless manner.

Alternatively, a central control device that intensively controls the respective wind sensors 13a and transmits output data such as the resistance value of the respective wind sensors 13a to the PC 10 can be connected between the respective wind sensors 13a and the PC 10. When the central control device is disposed, such a configuration is possible that the resistance value or the like, which is an output of each of the wind sensors 13a, is directly monitored and only when there is a wind sensor 13a that exceeds a threshold, the output data such as the resistance values of the respective wind sensors 13a is transmitted to the PC 10.

Figure 4:
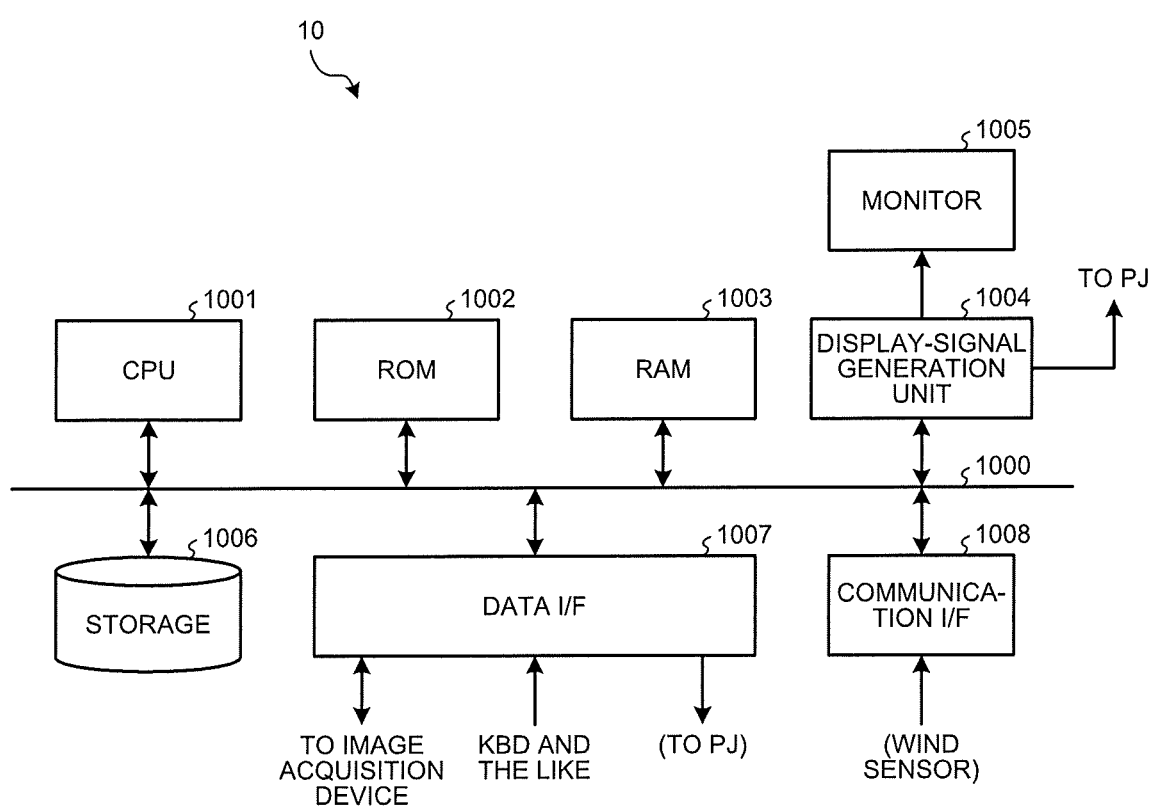
FIG. 4 is a diagram illustrating an example of a hardware configuration of a PC.

FIG. 4 is a diagram illustrating an example of a hardware configuration of the PC 10. As illustrated in FIG. 4, the PC 10 includes a CPU (Central Processing Unit) 1001, a ROM (Read Only Memory) 1002, a RAM (Random Access Memory) 1003, a display-signal generation unit 1004, a storage 1006, a data I/F 1007, and a communication I/F 1008. The respective units are connected with each other via a bus 1000.

The CPU 1001 controls the entire PC 10 according to a control program stored in the ROM 1002 and the storage 1006. A fixed program and fixed data are memorized in the ROM 1002. The RAM 1003 is used as a work memory. The display-signal generation unit 1004 converts display information generated by the CPU 1001 to a display signal corresponding to various types of display devices such as a monitor 1005 and the PJ 11 and outputs the converted display signal thereto. The monitor 1005 is a monitor for a manager of the PC 10.

The storage 1006 is an SSD (Solid State Drive), an HDD (Hard Disk Drive), or the like. The storage 1006 stores therein a control program and data.

The data I/F 1007 performs input/output of data from/to an input/output device. For example, image data output from the image acquisition device 20 and operation data from a mouse and a keyboard (KBD) are input to the data I/F 1007. Display information generated by the CPU 1001 can be output from the data I/F 1007 to the projector 11. Communication with the input/output device is performed by a predetermined interface such as a USB (Universal Serial Bus) or the Bluetooth®.

The communication I/F 1008 is a communication interface that communicates with the wind sensor 13a (for example, the wind sensor module 130). Communication with the wind sensor 13a can be performed via the data I/F 1007.

Next, the configuration of various tables in the DB 12 is described. The tables described herein are an example only, and can be configured by changing items in the table, deleting the table, or integrating the tables. The DB 12 includes a registration table, a management table, and the like. The DB 12 also includes various settings required for controlling the movement of a user image. Various settings required for controlling the movement of the user image are described appropriately in the descriptions of functional blocks.

Figure 5:
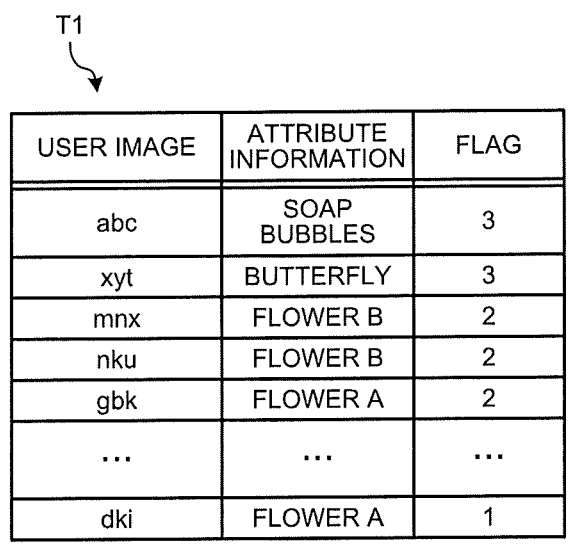
FIG. 5 is a diagram illustrating an example of a configuration of a registration table.

FIG. 5 is a diagram illustrating an example of a configuration of a registration table. Association between a user image and attribute information is illustrated in a registration table T1 illustrated in FIG. 5. Information indicating the type of a picture of a user image, for example, flowers, soap bubbles, a butterfly, and the like are set in the attribute information in this example. Flowers include various types and have different height and leaf shapes. Therefore, in this example, flowers are classified into a plurality of patterns, and some of these are illustrated as a flower A and a flower B. Undisplayed "1", displayed "2", and display completed "3" are set to the flag. Undisplayed "1" is a flag illustrating a user image that has not yet been used, displayed "2" is a flag illustrating a user image being used, and display completed "3" is a flag illustrating a user image whose usage has finished due to out of time or the like.

Figure 6:
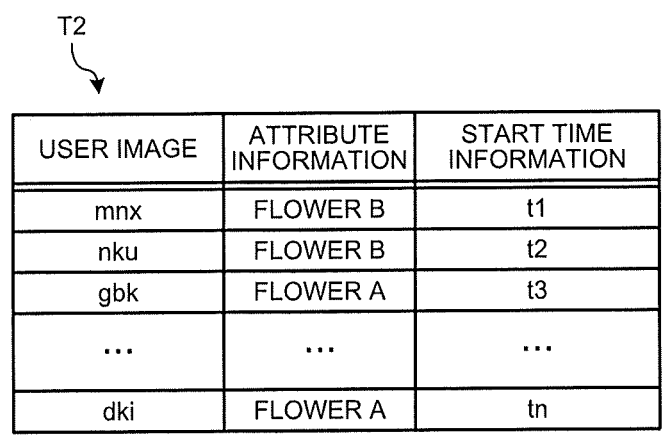
FIG. 6 is a diagram illustrating an example of a configuration of a management table.

FIG. 6 is a diagram illustrating an example of a configuration of a management table. Association among a user image, attribute information, and start time information is illustrated in a management table T2 illustrated in FIG. 6. Among the pieces of information acquired from the registration table T1, information to be displayed is set in the user image and the attribute information. The time to start addition of the user image is set to the start time information.

Next, a configuration of functional blocks of the PC 10 is described. Functions of the respective functional units are described herein with reference to FIGS. 9A and 9B to FIG. 19 appropriately, taking an example of user images of animals and plants.

Figure 7:
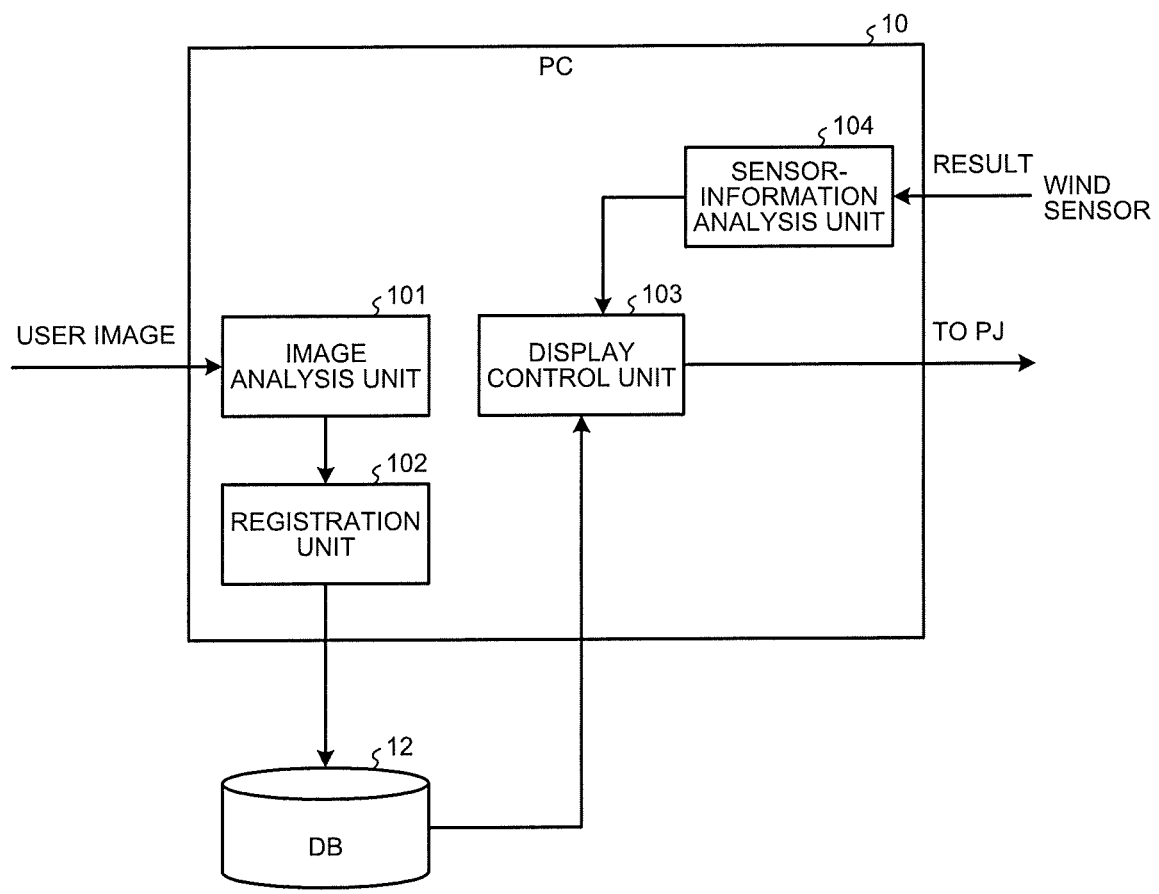
FIG. 7 is a diagram illustrating an example of a configuration of functional blocks of the PC.

FIG. 7 is a diagram illustrating an example of the configuration of functional blocks of the PC 10. Main functions associated with display control processing of display information generated by the PC 10 are illustrated in FIG. 7. As illustrated in FIG. 7, the PC 10 includes an image analysis unit 101, a registration unit 102, a display control unit 103, and a sensor-information analysis unit 104. The respective units are arranged as a module or the like, and are realized by reading respective programs from the storage 1006 and the ROM 1002 and executing the programs by the CPU 1001. A part or whole of the image analysis unit 101, the registration unit 102, the display control unit 103, and the sensor-information analysis unit 104 can be configured by dedicated hardware such as an ASIC. In the configuration, the sensor-information analysis unit 104 corresponds to "acquisition circuitry".

The image analysis unit 101 analyzes the entire image of the sheet 50 (see FIG. 1) acquired by the image acquisition device 20 to acquire a user image and attribute information from the entire image. The attribute information is an attribute of the user image, for example, in a case of a tulip or a peony, attribute information indicating the type of flower.

Specifically, the image analysis unit 101 detects a handwriting region 41 (see FIG. 9A) from the entire image (see FIG. 9A), and extracts a user image 410 (see FIG. 9A) from the detected handwriting region 41. The user image 410 includes a picture 45 of a certain type of flower (a flower A). The image analysis unit 101 detects an attribute setting region 42 (see FIG. 9A) from the entire image 40, to acquire the attribute information from the detected attribute setting region 42. The attribute information is acquired by performing processing corresponding to an encoding form of an attribute information image 420 (see FIG. 9A) set in the attribute setting region 42, for example, in this example, decoding of a QR Code®.

Figure 9A:
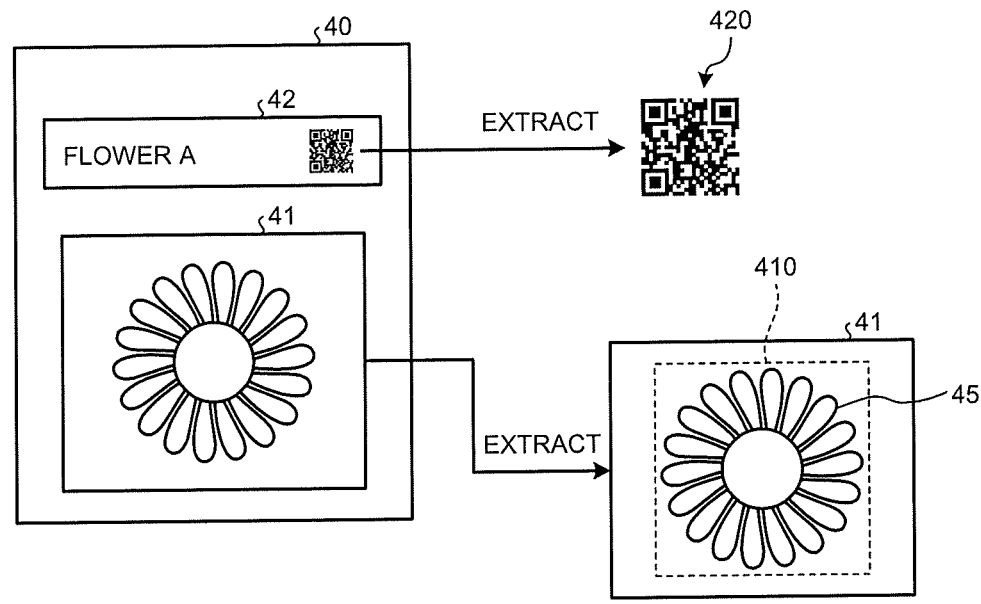
FIGS. 9A and 9B are explanatory diagrams of acquisition of a user image and attribute information from an entire image.
Figure 9B:
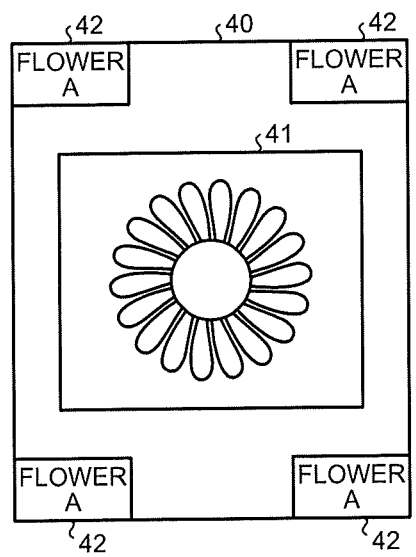

Alternatively, if the form of a sheet 50 is such that characters indicating the attribute information (a flower A in this example) are printed at four corners of the attribute setting region 42 as illustrated in FIG. 9B, text information indicating the attribute information is acquired by using character recognition or pattern matching. Further, in a case where a sheet 50 in such a form that a check mark is added in a check box disposed for each type of flowers as the attribute setting region 42 is used, by reading the check box where the check mark is added, the attribute information corresponding to the read check box is acquired. The attribute setting region 42 can be set in an arbitrary form in the sheet 50.

The registration unit 102 registers the user image and the attribute information acquired by the image analysis unit 101 in association with each other in the registration table T1 in the DB 12.

The display control unit 103 acquires a user image from the registration table T1 in the DB 12 and sets predetermined movement information that can change the movement by parameters in the user image. The image set with the movement is arranged at a predetermined initial position in a three-dimensional space (a 3D space) including a background image to move the image, and a two-dimensional plane projection image in the three-dimensional space is output as display information. The display control unit 103 also changes the movement of the user image according to a result acquired by the sensor-information analysis unit 104. The display information output from the display control unit 103 is output in a displayable form to the PJ 11 (see FIG. 1), and is projected from the PJ 11 to the projection medium 14 (see FIG. 1) as an image 100 (see FIG. 1). Details of the display control unit 103 are described with reference to FIG. 8.

The sensor-information analysis unit 104 supplies a value (a value indicating wind strength) corresponding to the respective wind sensors 13a (see FIG. 2) to the display control unit 103. The sensor-information analysis unit 104 converts detection results continually output from the sensor 13 (the respective wind sensors 13a) to values indicating the wind strength, continually updates the values corresponding to the respective wind sensors 13a, and supplies the values to the display control unit 103.

Figure 8:
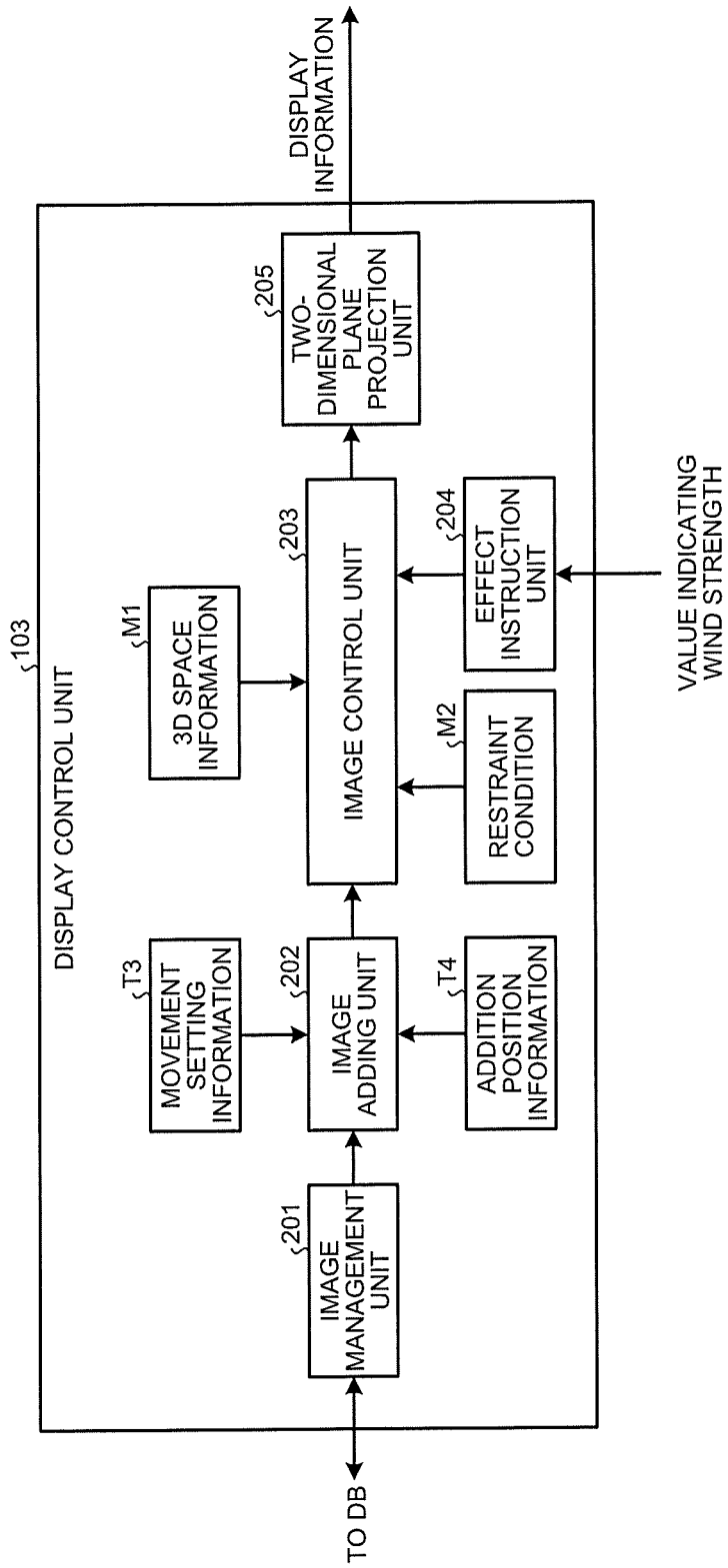
FIG. 8 is a diagram illustrating an example of a configuration of detailed functional blocks of a display control unit.

FIG. 8 is a diagram illustrating an example of a configuration of detailed functional blocks of the display control unit 103. The display control unit 103 illustrated in FIG. 8 includes an image management unit 201, an image adding unit 202, an image control unit 203, an effect instruction unit 204, and a two-dimensional plane projection unit 205. In this configuration, the image management unit 201, the image adding unit 202, the image control unit 203, and the two-dimensional plane projection unit 205 correspond to "generation circuitry". The image control unit 203 and the effect instruction unit 204 correspond to "control circuitry".

The image management unit 201 manages the user images stored in the DB 12, and outputs a displayable user image to the image adding unit 202. For example, the image management unit 201 acquires a user image with the flag undisplayed "1" and attribute information associated with the user image from the registration table T1 (see FIG. 5) in the DB 12, and outputs these to the image adding unit 202. The image management unit 201 also manages an elapsed time since registration to the DB 12 and the display start timing of the respective user images in the management table T2 (see FIG. 6), and instructs the image control unit 203 to remove a user image for which a predetermined time has passed from objects to be displayed.

The image adding unit 202 acquires and sets a movement pattern corresponding to each of the pieces of attribute information with respect to the displayable user image, from movement patterns set for each of the pieces of attribute information in movement setting information T3. The movement pattern indicates the movement, for example, in a two-dimensional plane, and a moving speed and a sway range can be changed by adjusting a set value to the parameter of a target portion.

Figures 10, 11:
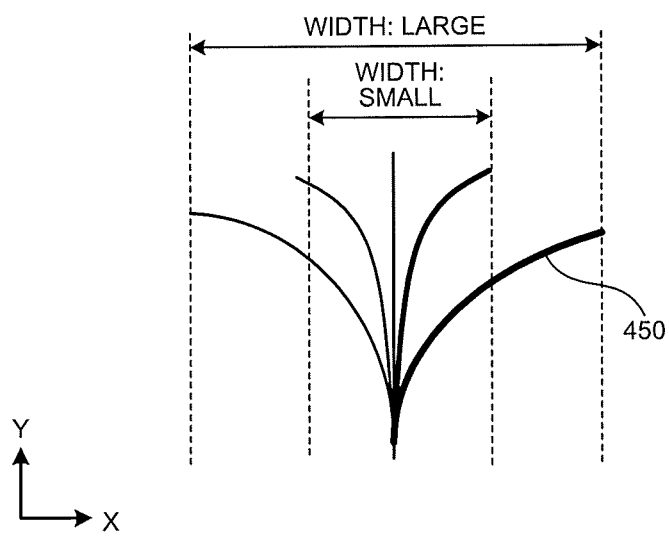
FIG. 10 is a diagram illustrating an example of setting of movement setting information.
FIG. 11 is an explanatory diagram of one of pieces of information indicating a movement pattern.

Setting of the movement performed by the image adding unit 202 is described with reference to FIG. 10 and FIG. 11. FIG. 10 is a diagram illustrating an example of setting of the movement setting information T3. As illustrated in FIG. 10, information indicating the movement pattern is set for each of the pieces of attribute information in the movement setting information T3. FIG. 11 is an explanatory diagram of one of pieces of information indicating the movement pattern. A movement pattern of the flower A is illustrated in FIG. 11.

As illustrated in FIG. 11, the flower A has a movement pattern in which a stem 450 sways from side to side (in an X-axis direction), and a user image 410 of the flower A is arranged at an end of the stem 450. In the user image 410, an outside region of a profile of a flower picture 45 is set to be transparent. In this movement pattern, a cycle and a sway range of the stem 450 swaying from side to side are adjusted by parameters. The cycle is, for example, a cycle of a sine wave. In this case, the stem 450 sways from side to side at a rate changing with the cycle of a sine wave. As the value indicating the wind strength increases, a value that shortens the cycle is set to the parameter. Accordingly, swaying of the flower becomes fast and the flower moves like fluttering in the wind. The sway range is adjusted from minimum to maximum as illustrated in FIG. 11 continuously or in a plurality of steps. By increasing the sway range, such a movement that the sway range becomes larger than a normal sway range by the wind can be expressed.

The movement of the flower can be expressed by only either one of the cycle or the sway range. Further, the flower moves and flutters in the wind more naturally by adding a parameter in addition to the cycle and the sway range.

In a case of a movement pattern of soap bubbles, such movements are set that a plurality of particles of soap bubbles are generated and moved, and then eliminated after a predetermined time. A generation cycle of the particles is adjusted by a parameter. For example, as the value indicating the wind strength increases, the generation cycle of particles of the soap bubbles is shortened.

The image adding unit 202 acquires addition position information corresponding to the attribute information of the user image from among the pieces of addition position information T4 indicating an initial position set beforehand for each of the pieces of attribute information, and instructs the image control unit 203 to add a user image at the position. The addition position information is position information in the 3D space.

Figure 12:
FIG. 12 is a diagram illustrating an example of setting of addition position information.

FIG. 12 is a diagram illustrating an example of setting of the addition position information T4. As illustrated in FIG. 12, a coordinate of the addition position is set for each of the pieces of attribute information in the addition position information T4. A flower illustrated as an example does not move from the initial addition position, and because a plurality of same kind of flowers may be arranged, the coordinate of the addition position is indicated by an area. The image adding unit 202 adds images of the same kind of flowers in a predetermined order of arrangement from the coordinates included in the area.

Referring back to FIG. 8, the image control unit 203 arranges a user image in the coordinate of the addition position in the 3D space indicated by 3D space information M1, and controls the movement of the user image in the 3D space according to a predetermined restraint condition M2, based on setting of respective user images in a parameter control table. The 3D space is a 3D space in which a predetermined background image is set, for example, on a rear surface. The restraint condition M2 is a condition that restricts the mutual movement of the user images so that the user images do not overlap on each other due to the movements of the respective user images in the 3D space, and moves the respective user images with a relationship between the same kind or different kinds of user images. For example, in a case of flowers arranged in the same area, a condition of swaying the flowers from side to side in synchronization with each other is included.

Figure 13:
FIG. 13 is a diagram illustrating an example of a configuration of a parameter control table.

FIG. 13 is a diagram illustrating an example of a configuration of the parameter control table. As illustrated in FIG. 13, identification information of the user image and setting of parameters for each user image are associated with each other in a parameter control table T5. In FIG. 13, because the user image is flowers, two parameters are set with respect to the user images. Parameters k1 and k3 are sway ranges, and parameters k2 and k4 are cycles. For example, $0 \leq k1 \leq 10$ can change a value of sway range from 1 (small sway) to 10 (large sway), and $0 \leq k2 \leq 10$ can change the cycle from 1 (long cycle) to 10 (short cycle). The parameters illustrated in the present embodiment are an example only, and the number of parameters is not limited thereto. For example, parameters of flowers can be increased. Further, parameters can be set appropriately according to the type of the user image.

The image control unit 203 executes control by applying as an initial value a minimum value (for example, in a case of a flower, "long cycle", "narrow sway range") or the like to the respective parameters of the user image to be added, at the time of adding the user image.

Figure 14:
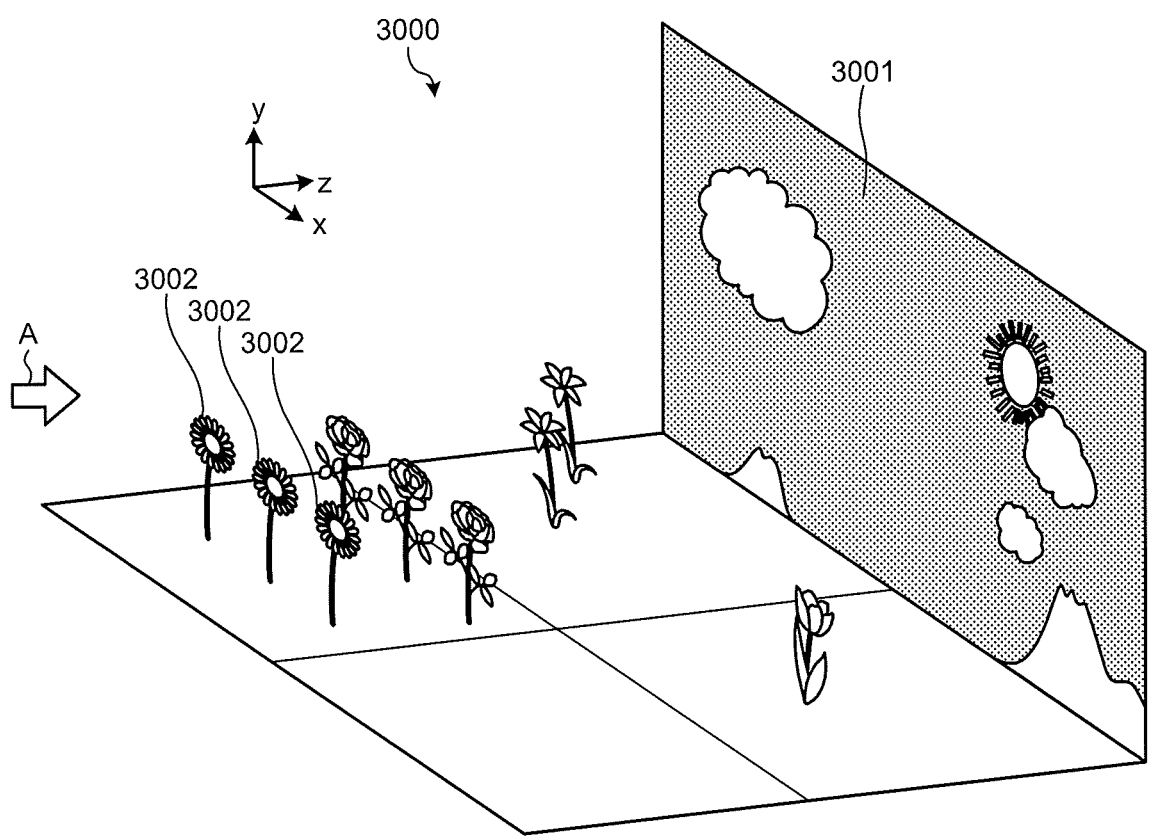
FIG. 14 is an explanatory diagram of control of a movement of a user image in a 3D space.

FIG. 14 is an explanatory diagram of control of the movement of a user image in a 3D space. FIG. 14 schematically illustrates the 3D space configured by 3D space information. A 3D space 3000 illustrated in FIG. 14 illustrates an area mainly corresponding to a display region, and a predetermined background image 3001 is disposed at an end surface thereof in a depth direction (a z direction). A space on the front side of the background image 3001 is a space in which a user image is to be moved, and respective user images with movement patterns being respectively set are arranged according to the addition position information T4.

For example, a left area in the front row in the 3D space 3000 is specified with respect to a flower A as the addition position information. Therefore, user images 3002 of the same flower A are arranged in an order in which the user images 3002 are added, in the left area in the front row. Other kinds of flowers are also arranged in the 3D space 3000 based on the addition position information T4.

The image control unit 203 controls the movement of respective flowers added to the respective positions so as to sway from side to side in a long cycle and with a minimum range in a movement pattern according to the kind of respective flowers. With regard to user images that move in the 3D space (although not illustrated here, for example, a butterfly, soap bubbles, or the like), the image control unit 203 restricts the movement of the user images in a display region and in a peripheral area thereof including the restraint conditions. The restraint conditions include a restraint condition such that the respective user images do not overlap on each other in the 3D space 3000.

Referring back to FIG. 8, the two-dimensional plane projection unit 205 projects a 3D space in which the image control unit 203 controls the movement of a user image to one plane of the display region and outputs a two-dimensional plane image. Specifically, in order to generate a two-dimensional plane image as viewed from an arrow A in FIG. 14, respective portions of the 3D space 3000 are projected to an end surface on the front surface side facing the surface of the background image 3001. At the time of projection, the two-dimensional plane projection unit 205 gradually reduces the size of the user images arranged at the back, as moving back in the depth direction (the z direction) in the 3D space 3000.

Figure 15:
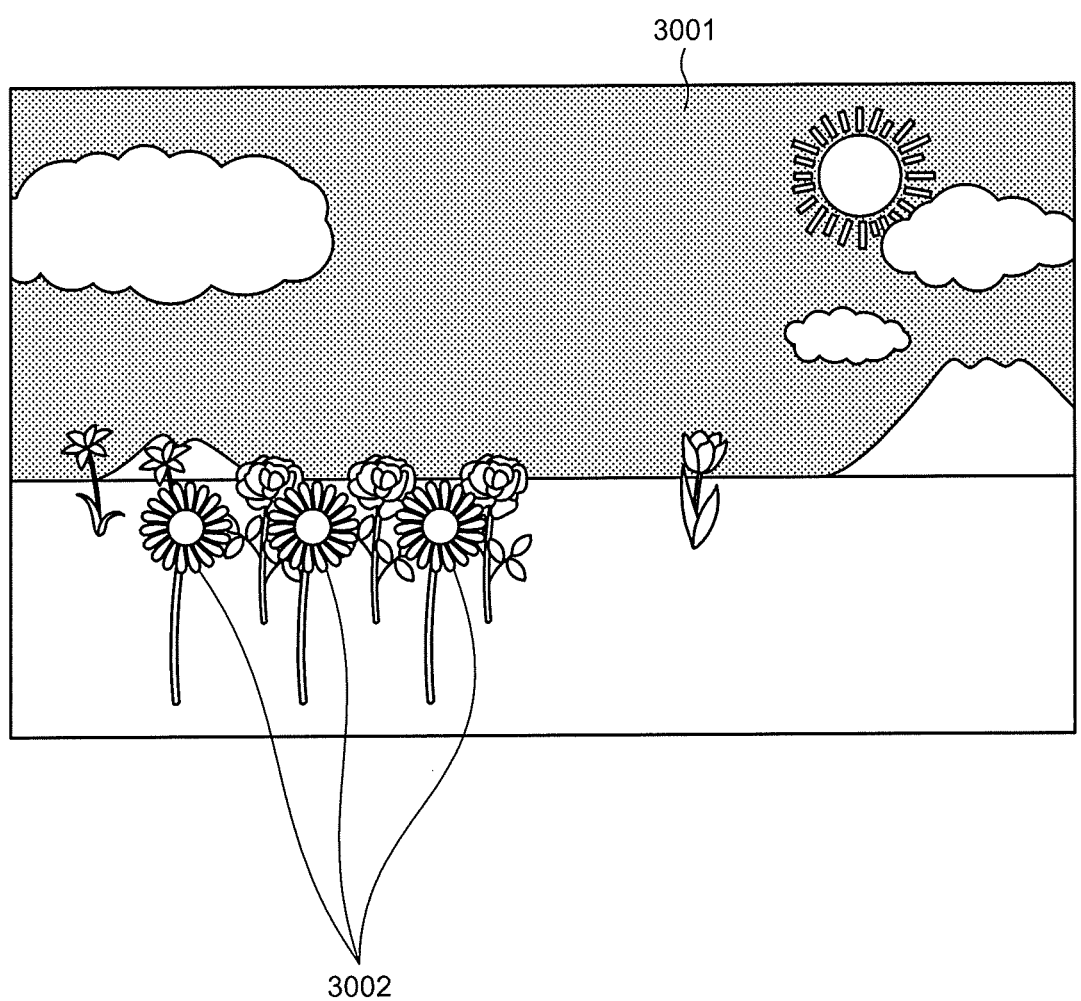
FIG. 15 is a diagram illustrating an example of a two-dimensional plane image when a two-dimensional plane projection unit projects the 3D space in FIG. 14.

FIG. 15 is a diagram illustrating an example of a two-dimensional plane image when the two-dimensional plane projection unit 205 projects the 3D space in FIG. 14 to a two-dimensional plane. As illustrated in FIG. 15, since the user images 3002 of the flower A are arranged in the front row, these flowers A are directly displayed, and the flowers in the back row are reduced in size. A portion thereof overlapped with the flower A in the front row is hidden and cannot be seen.

The two-dimensional plane images generated by projection by the two-dimensional plane projection unit 205 are generated at a predetermined frame rate and sequentially output as display information.

Referring back to FIG. 8, the effect instruction unit 204 reads the value indicating the wind strength of the respective wind sensors 13a, which is updated by the sensor-information analysis unit 104, continuously or at a predetermined timing, and instructs the image control unit 203 to implement an effect based on the read value indicating the wind strength of the respective wind sensors 13a. The effect means expressing the movement by the wind. The effect instruction unit 204 instructs start of a predetermined effect or movements of user images corresponding to the wind strength (for example, the speed of swaying the flower) to the image control unit 203.

Figure 16:
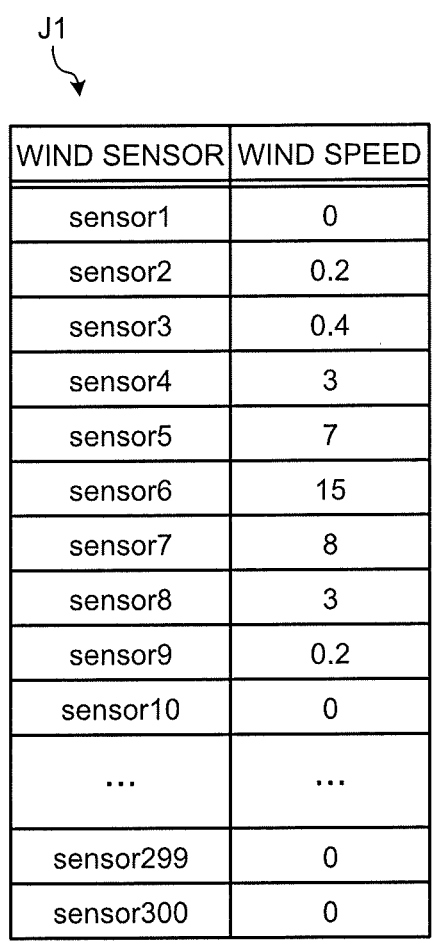
FIG. 16 is a diagram illustrating values indicating the wind strength detected by respective wind sensors in a list, which are updated by a sensor-information analysis unit.

FIG. 16 is a diagram illustrating values indicating the wind strength detected by the respective wind sensors 13a in a list, which are updated by the sensor-information analysis unit 104. The effect instruction unit 204 reads from the sensor-information analysis unit 104 list information J1 illustrated in FIG. 16, in which identification information of the respective wind sensors 13a (sensor "number") is associated with the value indicating the wind strength.

If there is a wind sensor 13a that detects the wind strength exceeding a predetermined threshold (a wind speed 7 or the like) in the values indicating the wind strength of the respective wind sensors 13a, in the list information J1 in FIG. 16, the effect instruction unit 204 instructs the image control unit 203 to implement an effect, for example, at a level corresponding to the value of the wind sensor 13a, with regard to an image displayed at a position or positions of one or a plurality of wind sensors 13a that detect the wind strength exceeding the predetermined threshold. The threshold can be changed as appropriate.

Figure 17:
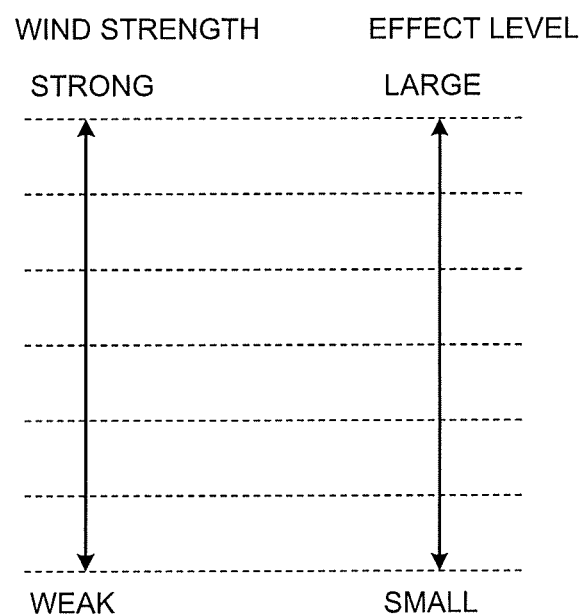
FIG. 17 is a diagram illustrating a correspondence relation between values indicated by the wind sensors and the degree of effect.

FIG. 17 is a diagram illustrating a correspondence relation between values indicated by the wind sensors 13a and the degree of effect (hereinafter, "level"). The values and the degree of effect are associated with each other such that as the value indicated by the wind sensor 13a increases, the effect level increases. The effect level is set such that, for example, as the wind becomes stronger, the movement of the user image becomes faster.

The effect instruction unit 204 holds information indicating the correspondence relation illustrated in FIG. 17 in advance, and information in which the sensor identification information and position coordinates (X, Y) of the respective wind sensors 13a in a projection surface are associated with each other. If there is a wind sensor 13a that has detected wind exceeding the predetermined threshold, the effect instruction unit 204 outputs the coordinate (X, Y) corresponding to the wind sensor 13a and the effect level to the image control unit 203.

The effect instruction unit 204 may instruct the image control unit 203 to implement an effect when a predetermined number of values exceeding the predetermined threshed are included in the values indicating the wind strength detected by the respective wind sensors 13a.

When there is an effect instruction from the effect instruction unit 204, the image control unit 203 controls a display content according to the instruction. For example, when a preset certain effect is instructed, control is executed so that a target user image moves with the certain effect by increasing the parameter value of the user image to a predetermined value decided beforehand. When an effect at a level corresponding to the value of each of the wind sensors 13a is instructed, the image control unit 203 executes control to move the respective user images corresponding to the positions of these wind sensors 13a with the effect corresponding to the values of the wind sensors 13a at the positions.

The effect is implemented, for example, by setting a maximum value (in the case of flowers, "short cycle" or "wide sway range") for a certain time, adding a corresponding increase amount to the parameter value according to the value, or initially setting the maximum value, gradually decreasing the value, and returning the value to the original value after a certain time. The parameter value increased to the predetermined value is returned to the original value at a point in time when the effect is ended, for example, after a certain time has passed.

Figure 18:
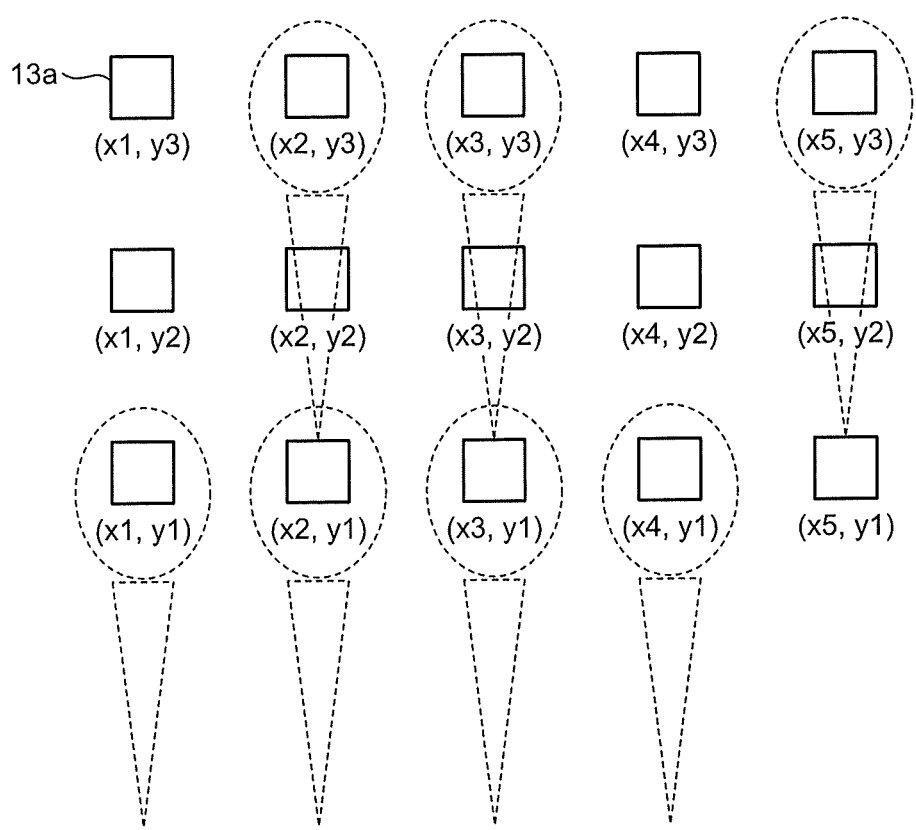
FIG. 18 is a diagram illustrating a state where flowers are made to be still for explaining the effect.
Figure 19:
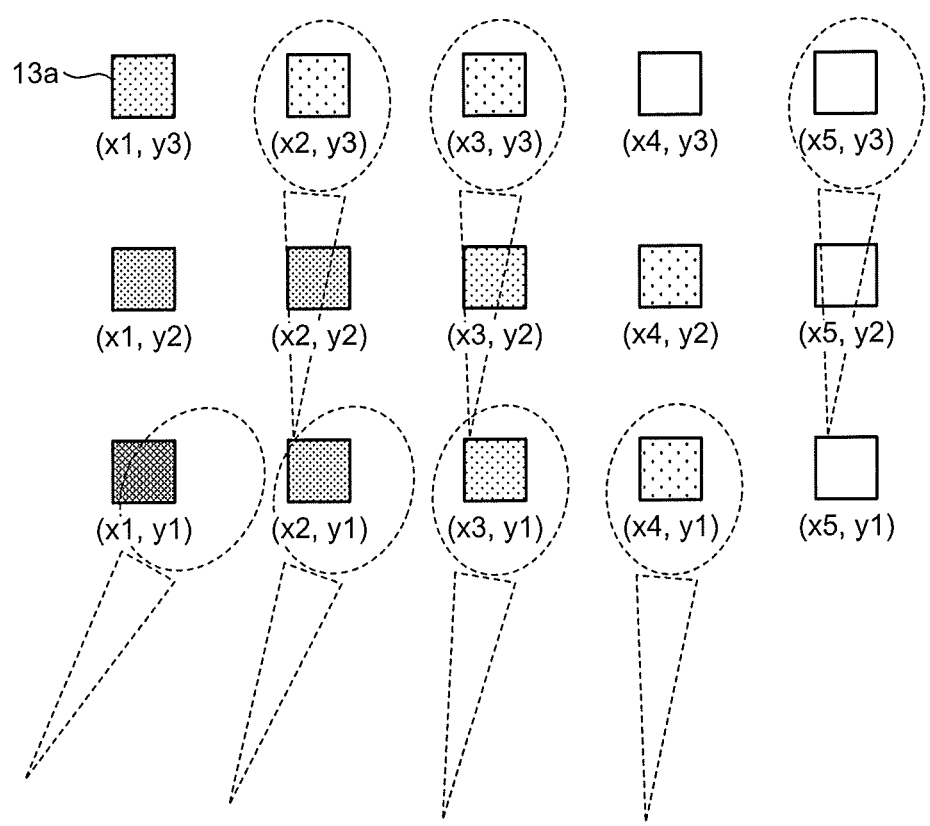
FIG. 19 is a diagram illustrating a change when a user breathes on target regions.

FIG. 18 and FIG. 19 are explanatory diagrams of the effect. In FIG. 18 and FIG. 19, the wind sensors 13a on the projection medium 14 and the display information illustrated in FIG. 15 are illustrated in association with each other. In actual practice, the display information is displayed on the projection medium 14 as an image 100 in an arrangement relation illustrated in FIG. 18 and FIG. 19, by adjusting the position where the image 100 (see FIG. 1) is projected. In FIG. 18 and FIG. 19, a partial region on the lower left part is illustrated in an enlarged view for explanations. Coordinates (x, y) illustrated in the wind sensors 13a are position coordinates of the respective wind sensors 13a in the display information in FIG. 15. In FIG. 18 and FIG. 19, flowers being the user images are indicated by an elliptic broken line, and the stems thereof are indicated by an inverted triangular broken line.

FIG. 18 illustrates a state where flowers are made to be still for explaining the effect. FIG. 19 illustrates a change in movement due to the effect when a user breathes on these regions via a display surface. In FIG. 19, hatching is gradually reduced sequentially from the wind sensor 13a that has detected strong wind, so that the wind strength can be seen. Outlined square representing the wind sensor 13a indicates that wind hardly reaches the wind sensor and the wind sensor cannot detect the wind.

That is, in the example illustrated in FIG. 19, such a state is represented that the wind sensor 13a corresponding to the position at a coordinate (x1, y1) detects the strongest wind, and as moving away from the position, the wind strength detected by the wind sensors 13a is weakened. At a coordinate (x4, y3) and a coordinate (x5, y1), sufficient wind does not reach the position and the wind cannot be detected. Therefore, flowers at positions corresponding to the wind sensors 13a indicated by hatching are specified as targets to which the effect is implemented.

In this example, a case where the effect level is changed according to the wind strength detected by the wind sensor 13a is illustrated. Therefore, the flower at the position at the coordinate (x1, y1) where the strongest wind is detected is illustrated with the largest sway range. As moving away from the flower, the sway range of flowers gradually decreases. Although the sway range of the flower has been described herein, the cycle at which the flowers sway from side to side is also changed. At the moment when strong wind is detected, the cycle of the flower at the position is changed to the shortest cycle, and as moving away from the flower, the swaying cycle of the flower is changed to become longer gradually. Therefore, sway of the flower when the wind blows can be reproduced realistically. The cycle and the sway range once changed return to the original state after a certain time has passed.

Next, a flow of the entire control processing of the display control system 1 performed by the PC 10 is described. First, a flow of basic control processing is described. Thereafter, a flow of effect processing at the time of detecting wind is described.

Figure 20:
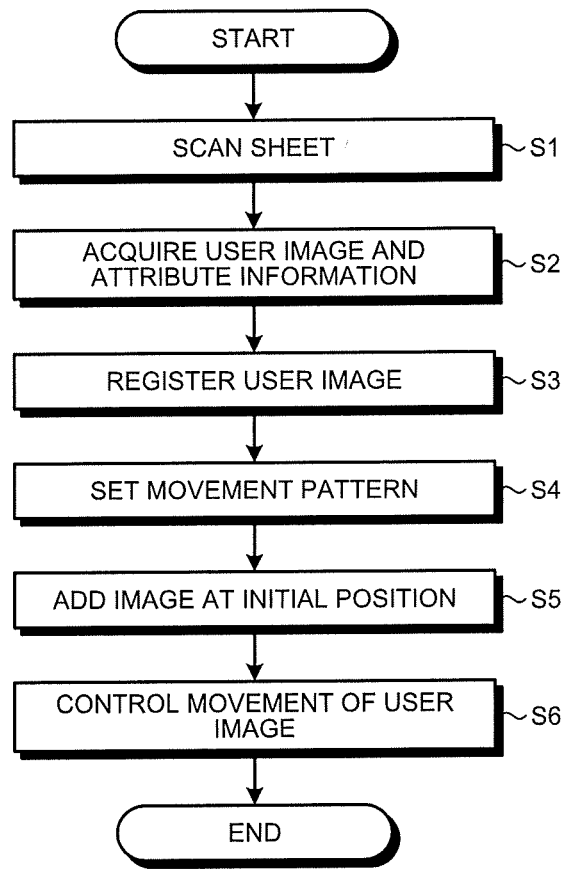
FIG. 20 is a flowchart illustrating an example of entire control processing of a display control system performed by the PC.

FIG. 20 is a flowchart illustrating an example of the entire control processing of the display control system 1 performed by the PC 10. First, the image acquisition device 20 (a scanner or the like) acquires an image (Step S1). For example, the image acquisition device 20 takes an image of a sheet 50 to acquire an image 40 of the entire sheet 50 (see FIGS. 9A and 9B), when a staff member or the like sets the sheet 50 on a platen (see FIG. 1) and presses an execution button.

Next, the image analysis unit 101 acquires the image 40 output from the image acquisition device 20 and analyzes the image 40 to acquire a user image 410 (see FIGS. 9A and 9B) and attribute information thereof (Step S2).

Next, the registration unit 102 registers the user image 410 and the attribute information acquired by the image analysis unit 101 in association with each other in the registration table T1 (see FIG. 5) in the DB 12 (Step S3).

Next, the image management unit 201 acquires the user image 410 with a flag undisplayed "1" (see FIG. 5) and the attribute information associated with the user image 410 from the registration table T1 in the DB 12, and outputs these to the image adding unit 202.

Next, the image adding unit 202 acquires a movement pattern corresponding to the attribute information from the movement patterns in the movement setting information T3 (see FIG. 10) and sets the movement pattern with respect to the user image 410 received from the image management unit 201 (Step S4).

Next, the image adding unit 202 acquires addition position information corresponding to the attribute information of the user image from the addition position information T4, and instructs the image control unit 203 to add the user image to the position (Step S5).

Next, the image control unit 203 arranges the user image in a 3D space, and controls the movement of the user image based on setting or the like of the user image in the parameter control table T5 (see FIG. 13) (Step S6). The state in the 3D space is output as a two-dimensional plane image (see FIG. 15) by projection by the two-dimensional plane projection unit 205 and is displayed with a predetermined frame rate.

Figure 21:
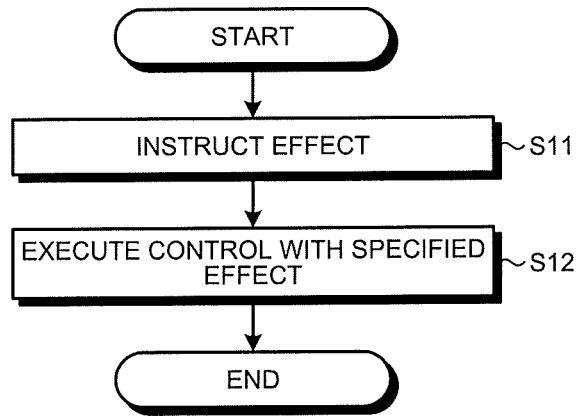
FIG. 21 is a flowchart illustrating an example of effect processing when wind is detected.

FIG. 21 is a flowchart illustrating an example of the effect processing when wind is detected. First, the effect instruction unit 204 reads a value indicating the wind strength of each of the wind sensors 13a (see FIG. 16) updated by the sensor-information analysis unit 104. When the read value indicating the wind strength of each wind sensor 13*a* exceeds a threshold (in the example illustrated in FIG. 16, for example, "7"), the effect instruction unit 204 instructs the image control unit 203 to start the effect (Step S11). The effect instruction unit 204 can instruct only start of the effect to the image control unit 203 or can instruct a coordinate as an effect target and the effect level in the display information to the image control unit 203.

Next, upon reception of the instruction of effect from the effect instruction unit 204, the image control unit 203 executes control so that a target user image moves with the specified effect by changing a parameter value of the user image or the like (Step S12). For example, in a case of a flower, because the position thereof is fixed, the image control unit 203 can judge which flower is the target based on the coordinate instructed from the effect instruction unit 204. Regarding a moving object such as a butterfly, the image control unit 203 judges whether to implement the effect based on whether the butterfly is in the target coordinate.

It is assumed that the image control unit 203 executes control so that a changed parameter value is returned to the original value after a certain time has passed.

As described above, according to the display control system of the present embodiment, when a user breathes on an image 100 displayed on the projection medium 14 via a display surface, wind can be detected. Further, according to the display control system, since a region on which the user breathes can be specified, such an effect that a user image in the region on which the user breathes in an image projected to the projection medium 14 is swaying in the wind can be implemented and displayed. Therefore, according to the display control system, it is possible to cause an image displayed on a display surface to perform a movement reflecting a user's instruction, and as a result, further entertaining feature can be provided.

In the present embodiment, a configuration in which the wind sensors 13*a* are arranged at respective positions on the display surface of the projection medium 14 has been described as an example. However, the present embodiment can be implemented for a case where the wind sensor 13*a* is installed only at one position or at several positions in the projection medium 14. In this case, it suffices that, for example, the entire image or a user image in a predetermined partial region displayed on the projection medium 14 is displayed by similar effect processing, when the wind sensor 13*a* detects wind.

First Modification

A configuration of a display control system using a communication device for wind detection in which a sensor 13 is incorporated in a portable pen-type or stick-type casing is described. A mode described in a first modification is not such that a user directly breathes on an image via a display surface. Therefore, the projector 11 of the display control system 1 (see FIG. 1) can be replaced by a large monitor. The present modification is described as having the same configuration as that of the above embodiment. In the present modification, explanations of portions common to the embodiment are omitted as appropriate, and portions different from the embodiment are mainly explained.

When a communication device is used, a wind effect can be implemented to the entire image or to each region by associating the communication device with regions of the display image beforehand. As an example, a mode in which a wind effect is implemented to each region of a display image is described herein.

Figure 22:
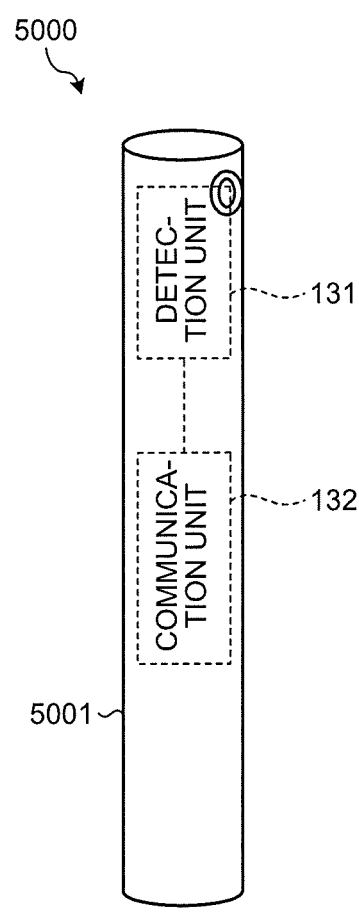
FIG. 22 is a diagram illustrating an example of a configuration of a communication device according to a first modification.

FIG. 22 is a diagram illustrating an example of a configuration of the communication device according to the first modification. A communication device 5000 illustrated in FIG. 22 is a communication device for wind detection in which one wind sensor module 130 is incorporated in a portable pen-type or stick-type casing 5001.

In the communication device 5000, the detection unit 131 that detects wind when a user breathes on the communication device 5000 is exposed to the outside from an air hole such as a slit or a through-hole in the casing 5001, for example. Similarly to the wind sensor module 130 described in the embodiment, the communication device 5000 has a configuration in which when the detection unit 131 detects wind, data is transmitted to the PC 10 through the communication unit 132. Further, the communication unit 132 and the PC communicate with each other in a wired or wireless manner.

The communication device 5000 is described herein as having such a size that a user uses the communication device 5000 by holding it. In this case, the communication device 5000 can be used in such a manner that the communication device 5000 gives an instruction by a motion such as shaking. For example, by shaking the communication device 5000, wind can be generated. Further, the mode can be modified to a mode in which the communication device 5000 is installed at a predetermined position to be used.

In this modification, such an example is described that three communication devices 5000 are formed as an example, and respective communication devices implement a wind effect in three respective corresponding regions of a display image. The number of communication devices 5000 is an example only, and is not limited thereto. For example, the number of communication devices 5000 can be one, two, or four or more. By increasing the number, the wind effect can be implemented in finer regions. Further, if preliminarily set, different effects can be implemented to the same region according to the respective communication devices 5000.

FIG. 23 is an explanatory diagram of how to divide regions to be associated with each of the three communication devices 5000 with respect to a display image region. The display image region is a region of the projection medium 14 (see FIG. 1) in which an image 100 is displayed. FIG. 23 illustrates an example in which the projection medium 14 is divided into three regions in an X direction. In FIG. 23, a communication device 5000 (1) of the three communication devices is associated with a first region, another communication device 5000 (2) of the three communication devices is associated with a second region, and a remaining communication device 5000 (3) of the three communication devices is associated with a third region.

FIGS. 24A and 24B are diagrams illustrating a setting example of a table in the case of the manner of division illustrated in FIG. 23. FIG. 24A illustrates a table in which identification information of the communication device is associated with identification information of the region. FIG. 24B illustrates a table in which the identification information of the region is associated with information indicating a range of the region (range information). In a table configuration illustrated in FIGS. 24A and 24B, how to divide the three regions illustrated in FIG. 23 can be appropriately changed only by changing the range information in the table illustrated in FIG. 24B. For example, in FIG. 23, a width in the X direction of the three regions can be set to widths different from each other. Three regions illustrated in FIG. 23 can be also changed to a setting in which the three regions are divided in a Y direction. The three regions can be also set to an arbitrary shape respectively. Further, some region of the display regions can be set so as not to be included in an effect range.

The hardware configuration of the display control system and the configuration of the functional blocks according to the first modification are substantially the same as those of the embodiment. Different points in some part of processing of the display control unit 103 are described with reference to FIG. 8.

In the configuration of the first modification, an image control unit 203 refers to the respective tables illustrated in FIGS. 24A and 24B upon reception of an effect instruction from the effect instruction unit 204, to implement a predetermined effect with respect to a user image in a target region. For example, all the user images in the target region are moved by providing a predetermined parameter value thereto. Further, a different effect can be implemented for each target region. For example, changed values of parameters are preset for each target region, and when there is an effect instruction by any of the communication devices, for example, the communication device 5000 (1), a changed value of the region corresponding to the communication device 5000 (1) is used to implement the effect with respect to an image in the region. When the effect instruction unit 204 instructs an effect level by selecting and specifying the level from multiple stages according to the wind strength, a changed value corresponding to the selected level is provided to the parameter to implement the effect.

In this manner, according to the first modification, wind can be caused with respect to a display image from a position away from the projection medium 14 by using the communication device 5000. Further, by disposing a plurality of communication devices, the display image region can be divided into a plurality of regions, and wind can be caused individually with respect to an image in each region by using a communication device corresponding thereto. Further, since by using the communication device, installation on the projection medium 14 becomes unnecessary, application of the first modification to a large display such as a liquid-crystal display becomes possible.

Second Modification

A predetermined content can be displayed instead of changing the movement of a target user image at the time of detecting wind. For example, the sensor 13 is installed in a gate having a size through which a user can pass. The sensor 13 installed in the gate detects wind that is caused every time a user passes through the gate. In such a configuration, a predetermined content is displayed. The gate is illustrated herein as an example. In addition, so long as wind can be detected when a user passes by a post or through a wall or the like, the wind sensor can be installed on the post, the wall, or the like to be appropriately applied.

Figure 25:
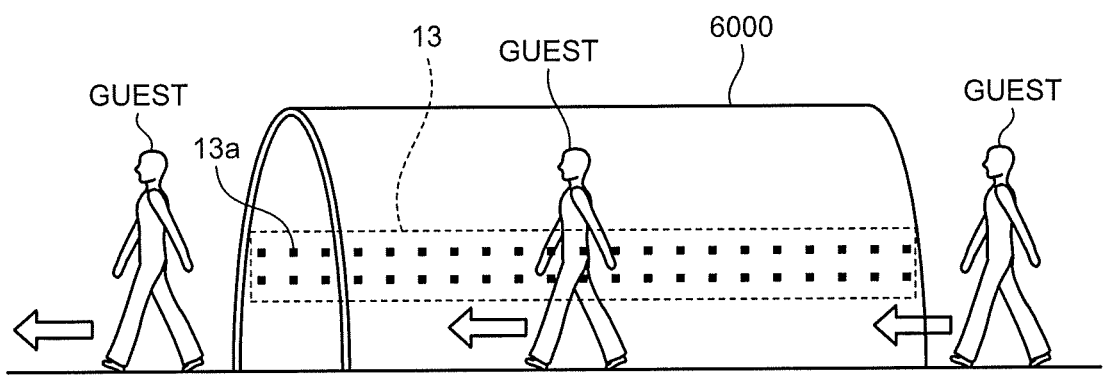
FIG. 25 is a diagram illustrating an example of a configuration of a gate according to a second modification.

FIG. 25 is a diagram illustrating an example of a gate configuration according to a second modification. A gate 6000 illustrated in FIG. 25 has a size through which users (guests) can pass. FIG. 25 illustrates an example in which the sensor 13 (a plurality of wind sensors 13a) is arranged at a height where the user passes. Arrangement of the sensor 13 is an example only, and the sensor can be arranged appropriately in any arrangement that can detect wind easily. For example, the sensor can be arranged on the entire surface inside of the gate 6000.

Figure 26:
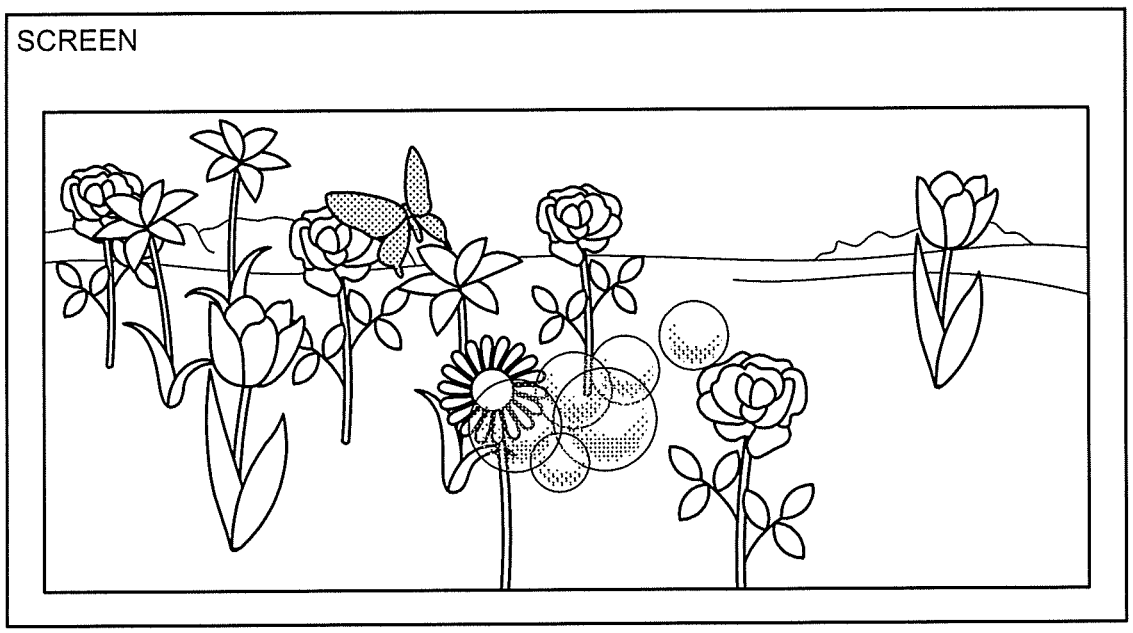
FIG. 26 is a diagram illustrating an example of a content prepared in advance.

FIG. 26 is a diagram illustrating an example of a content prepared in advance. FIG. 26 illustrates a state where animation in which a butterfly flies in a field of flowers is reproduced. A state at the time of generating soap bubbles is illustrated in the middle of the field of flowers. In this manner, an animation with a predetermined effect can be displayed as a content in a predetermined reproduction time. After completion of the animation, the display returns to the original state. The content is not limited to animation. Alternatively, a still image and a dynamic picture image produced beforehand can be displayed.

A change of the movement of a user image and display of a predetermined content can be performed selectively. When a change of the movement of a user image and display of a predetermined content is selectively performed, selection can be performed, for example, based on the wind strength, or based on an identification number of a wind sensor that has detected wind. When selection is performed based on the identification number of the wind sensor that has detected wind, for example, the wind sensors 13a installed in the projection medium 14 illustrated in the embodiment, the communication device 5000 illustrated in the first modification, and the gate 6000 illustrated in the present second modification can be used together.

Figure 27:
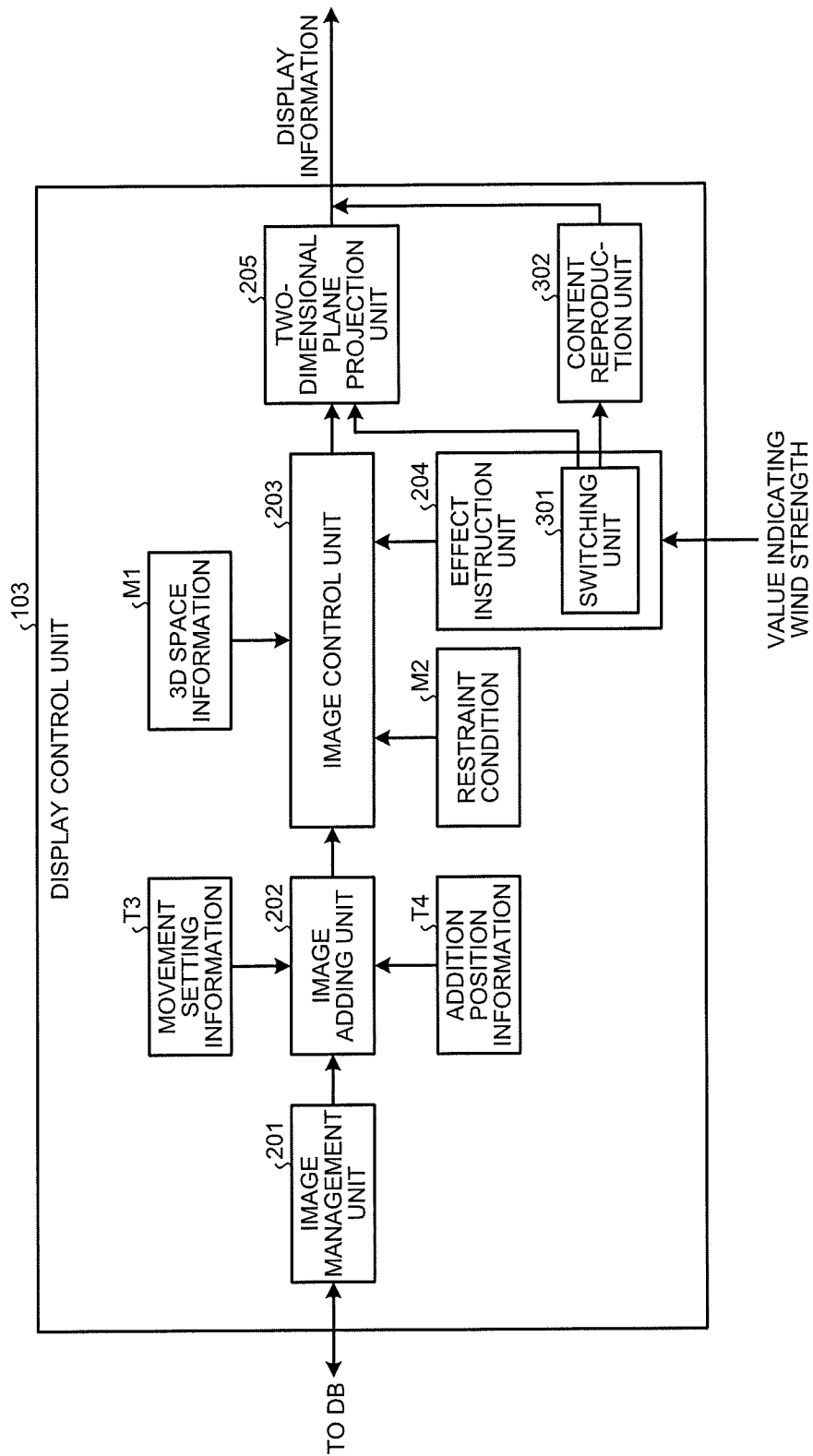
FIG. 27 is a diagram illustrating an example of a configuration of functional blocks.

FIG. 27 is a diagram illustrating an example of the configuration of the functional blocks. In FIG. 27, a switching unit 301 is disposed in the effect instruction unit 204 and a content reproduction unit 302 is further disposed in the configuration of the functional blocks illustrated in FIG. 8. The switching unit 301 corresponds to "switcher".

When the effect instruction unit 204 instructs an effect, the switching unit 301 confirms an identification number of a wind sensor that has detected wind equal to or higher than a threshold. When the identification number of the wind sensor is a predetermined identification number, the switching unit 301 stops output from the two-dimensional plane projection unit 205, and instructs the content reproduction unit 302 to reproduce the content. For example, when the identification number is the number of a wind sensor installed at the gate 6000, the switching unit 301 switches the display to content reproduction. Thereafter, upon detection of end of the content reproduction from the content reproduction unit 302, the switching unit 301 restarts output from the two-dimensional plane projection unit 205.

The content reproduction unit 302 reproduces a predetermined content such as an animation, and outputs reproduced display information to the PJ 11.

Judgment as to whether to cause a movement with respect to an event image or reproduce the content can be appropriately changed by setting a judgment table referred to by the switching unit 301. For example, identification numbers of the communication devices can be included in the judgment table as identification numbers for reproducing the content. Further, not only the judgment by the identification number but also judgment can be performed according to the wind strength by setting the wind strength. For example, the configuration can be appropriately modified such that a movement is caused with respect to an event image when wind having strength from a first threshold to a second threshold is detected, and the content is reproduced when wind stronger than the second threshold is detected.

Further, the configuration can be modified such that a plurality of contents are prepared, and a corresponding content among these is reproduced. For example, the wind sensors 13a installed in the gate 6000 are classified for each area, and a different content is reproduced according to the area in which wind is detected. Further, different contents can be reproduced according to the wind strength. In any case, a plurality of contents are registered as the contents to be reproduced by the content reproduction unit 302, and the switching unit 301 notifies the content reproduction unit 302 of the content number corresponding to the wind strength and the identification number of the wind sensor.

Even when the gate 6000 is used, a configuration that causes a movement with respect to an event image, for example, control to cause a movement in a unit of area can be combined.

In this manner, by the configuration of the second modification, reproduction of a content becomes possible, and it can be selected whether to cause a movement with respect to the event image or reproduce the content, in combination with the configurations of the embodiment and the first modification. Therefore, a user instruction can be reflected to an image displayed on a display surface, and as a result, further entertaining feature can be provided.

Third Modification

A mode in which flowers being displayed are caused to sway by generating wind has been described above as an example. However, the configuration can be such that a plurality of people move a picture respectively to play in cooperation with each other or to play against each other. As an example, the configuration is modified such that a user image drawn by a first user and a user image drawn by a second user can play against each other by using wind strength. For example, respective user images are arranged at opposite ends of a display region. Respective users breath on their own user image in an image projected on a projection medium to move the user image toward the opponent. The user image of the opponent is knocked down by the breathing strength of the wind to fight it out. Breathing on the user image can be performed by using the communication device.

The program for executing the processes according to the embodiment and the respective modifications described above are stored in a computer-readable recording medium such as a CD (Compact Disk) and a DVD (Digital Versatile Disk) as a file of an installable format or an executable format and provided. The present invention is not limited thereto, and the program for executing the processes according to the embodiment and the respective modifications can be stored in a computer connected to a communication network such as the Internet, and then downloaded via the communication network, and provided. Further, the program for executing the processes according to the embodiment and the respective modifications can be provided or distributed via a communication network such as the Internet.

While the embodiment and the respective modifications described above are preferred examples for carrying out the present invention, the present invention is not limited thereto, and the invention can be also carried out by other various modifications within a range not departing from the scope of the present invention.

Respective functions in the embodiment described above can be realized by one or plural processing circuits. The term "processing circuit" in the present specification includes devices such as a processor programmed to execute respective functions by software such as a processor installed in an electronic circuit, an ASIC (Application Specific Integrated Circuit) designed to execute the respective functions described above, a DSP (Digital Signal Processor), and an FPGA (Field Programmable Gate Array), and a conventional circuit module.

The device group described in the embodiment is merely an example of a plurality of possible computing environments for carrying out the embodiment disclosed in the present specification. In a certain embodiment, the DB 12 includes a plurality of computing devices such as a server cluster. The computing devices are configured to be able to communicate with each other via an arbitrary type of communication link including a network and a shared memory, thereby performing the processes disclosed in the present specification. Similarly, the PC 10 can include a plurality of computing devices configured to communicate with each other.

According to an embodiment, it is possible to cause an image displayed on a screen to perform a movement reflecting a user's instruction.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. A display control system, comprising:
   a display configured to display an image that performs specified movement, according to movement information provided on an input sheet;

a detector including at least one wind sensor configured to detect wind and being installed in a display area, of the display, in which the image is displayed; and a controller configured to, in response to the detector detecting the wind, perform control to change the specified movement within the image according to the movement information, based on a strength of the detected wind.

2. The display control system according to claim 1, wherein the controller is further configured to, in response to the detector detecting the wind, control a movement of an individual image included in the image, based on the strength of the detected wind.

3. The display control system according to claim 2, wherein the controller is further configured to adjust a moving speed of the individual image to a speed corresponding to the strength of the wind.

4. The display control system according to claim 1, wherein the controller is further configured to switch control of a movement of an individual image according to identification information of the detector.

5. The display control system according to claim 2, wherein
the detector comprises a plurality of wind sensors, and
the controller is further configured to control the movement of the individual image, which is displayed in a predetermined region of a display area, the predetermined region being associated with a particular wind sensor of the plurality of wind sensors, the particular wind sensor detecting the wind.

6. The display control system according to claim 5, wherein the controller is further configured to adjust the movement of the individual image in the predetermined region corresponding to the particular wind sensor of the plurality of wind sensors, the particular wind sensor detecting the wind, to a movement corresponding to the strength of the wind detected by the particular wind sensor.

7. The display control system according to claim 1, wherein the controller is further configured to, in response to the detector detecting the wind, switch the image to a display of a predetermined content based on the strength of the detected wind.

8. The display control system according to claim 1, wherein the controller is further configured to, in response to the detector detecting the wind, selectively replace the image by one content of a plurality of contents according to detection information received from the detector.

9. The display control system according to claim 1, wherein
the at least one wind sensor includes a plurality of wind sensors arranged in the display area of the display in which the image is displayed, and
the controller is further configured to control the movement of an individual image in an image region corresponding to a particular wind sensor of the plurality of wind sensors, the particular wind sensor detecting wind.

10. The display control system according to claim 1, wherein the detector comprises a communication device including the at least one wind sensor.

11. The display control system according to claim 1, wherein the detector is further configured to detect wind caused by passage of a person.

12. The display control system according to claim 11, wherein the detector includes a plurality of wind sensors, which are installed in a passageway through which the person passes and detect the wind caused by passage of the person.

13. The display control system according to claim 2, wherein the controller is further configured to control a movement pattern of the individual image to differ according to an attribute of the individual image.

14. The display control system according to claim 2, wherein the controller is further configured to control the individual image, which is arranged in a three-dimensional space, to control the movement.

15. The display control system according to claim 1, further comprising image acquisition circuitry configured to acquire an input image of a material drawn on a medium,
wherein the controller is further configured to control the movement of the image acquired by the image acquisition circuitry as an individual image.

16. The display control system of claim 1, wherein the detector includes a plurality of wind sensors arranged in the display area on a surface of the display.

17. The display control system of claim 1, further comprising an image acquisition device including an image sensor and configured to acquire the movement information by reading the input sheet.

18. A display control device, comprising:
generation circuitry configured to generate display information of an image displayed on a display, the image performing specified movement, according to movement information provided on an input sheet;
acquisition circuitry configured to acquire detection information of wind from a detector including at least one sensor configured to detect the wind and being installed in a display area, of the display, in which the image is displayed; and
control circuitry configured to perform control to change the specified movement within the image according to the movement information, based on a strength of wind included in the detection information.

19. A display control method, comprising:
displaying, on a display, an image that performs specified movement, according to movement information provided on an input sheet;
detecting wind with a detector including at least one sensor configured to detect the wind and being installed in a display area, of the display, in which the image is displayed; and
controlling, in response to detecting the wind, the specified movement within the image according to the movement information, based on a strength of the detected wind.

* * * * *